Patented May 22, 1923.

1,456,494

UNITED STATES PATENT OFFICE.

ANDREW J. ROWLAND, OF CINCINNATI, OHIO.

OILPROOF COATING OR IMPREGNATING AGENT.

No Drawing.   Application filed August 6, 1920.  Serial No. 401,730.

*To all whom it may concern:*

Be it known that I, ANDREW J. ROWLAND, a citizen of the United States, residing at Cincinnati, in the county of Hamilton and State of Ohio, have invented and discovered a certain new and useful Oilproof Coating or Impregnating Agent, of which the following is a specification.

The object of my invention is to produce an economical, efficient and durable coating, impregnating agent, varnish or paint which is odorless, tasteless and possesses a fair degree of pliability and adhesiveness, and which, among other uses, is particularly adapted for receptacles for edible fats or oils, such as lard, lard compounds, butter, butter compounds, artificial lards or butters, olive oil, cotton seed oil, linseed oil, machine oils, and oils other than for edible purposes, turpentine, paints, varnishes, alcohol, gasolene, kerosene, naphtha, benzol, acetone and any commodity of an oily nature, edible food products, such as salmon and other food and milk products, such as cottage cheese, cream, ice cream, pickles or other edible products put up in vinegar, syrups, honey, molasses, butter-milk, dry products, such as baking powder, and soda, and any other dry product.

My invention consists in a new and useful oilproof coating or impregnating agent for paper, pulp, fabric, metallic, wooden, and glass or other surfaces or containers, and the process of producing and applying said coating or impregnating agent.

My invention further consists in the application of said product in its viscous state to paper, pulp, fabric, wood, glass, metallic or other surfaces for the purposes herein set forth.

The advantage of this product is that it forms an efficient coating which does not impart any poisonous effects to the materials, such as edible oils or fats contained within the receptacle provided with this coating or impregnated therewith. This product is also useful as a base to be used with other ingredients for the purposes set forth herein.

The product is obtained by boiling algæ, preferably washed free of readily soluble or other chemical salts contained in the sea water, until the mucilaginous material of the weed is dissolved free from the fibrous matter and then the solution is strained to eliminate any fibrous material and this solution is then ready for use. The solution after the first filtration for the removal of fibrous material has the appearance of the white of an egg and jells readily on cooling. After standing for ten hours or longer, the suspended matter in the solution tends to clump together as a flocculent precipitate which can then be easily filtered out. The solution when freed from this precipitate is white and nearly clear and jells on cooling. It may be desirable to remove this suspended matter from the solution, although it is not necessary in so far as the oilproof properties or the effectiveness of the solution are concerned. The consistency of the solution may be varied by the amount of water used therein and this will be regulated by the purposes for which the solution is required, as for instance, on glass or glazed paper which the product will not penetrate, more water than otherwise may be used in order to produce a very thin solution. The solution may be used either as a coating to be applied either by dipping or by a brush or spraying, or the first coat may be applied by dipping or by a brush and the second coat by spraying, or the respective coats may be varied in the method of application as desired. As many coats may be applied as desired. The containers may also be coated by being filled with the solution and emptied which leaves a good coating all over the inside of container. The solution may be used either warm or cold.

When the product is used as an impregnating material, it is thoroughly mixed with the material, such as pulp, in the manufacture of the article, or if the surface is porous, such as wood or cloth or soft and porous paper, it will penetrate the same when applied as a coating by dipping or otherwise.

The amount of water used is immaterial except as a means for boiling the algæ to obtain the desired product, and except for the purpose of regulating and varying the desired degree of consistency. After the product is obtained its consistency may be thinned by the introduction of water, or it can be thickened by boiling off more of the water.

Considerable variation in the proportions of algæ and water may be made within the scope of my invention as defined in the accompanying claims, but as a desirable proportion I give the following example: Take ten (10) parts of Irish moss to one hundred (100) parts of water and boil for about one hour, then strain in a coarse sieve or canvas strainer which removes the fibrous stocky matter of the Irish moss, giving a solution that is fairly clear and is ready for use without any further treatment, or the solution may be filtered after standing from ten (10) to twenty (20) hours to remove any further precipitate that may be formed in that time. Fairly good results may also be obtained by using from eight (8) to ten (10) parts of Irish moss to ninety (90) to one hundred and ten (110) parts of water.

It will be found that other species of algæ than Irish moss will require varying amounts in proportion to the amount of water used, depending upon the amount of mucilaginous material contained in the particular species being used. However, it may be said that with the information herein given no experimenting is necessary to carry my invention into effect, but the desired result will be readily obtained by merely boiling the ingredients until the product reaches the desired consistency for its particular use.

Having described my invention and its manner of use, what I claim as new and desire to secure by Letters Patent is:

1. A composition of matter consisting of about one hundred (100) parts of water and about ten (10) parts of algæ.

2. A composition of matter consisting of water and algæ, the proportion of water ranging from about ninety (90) to one hundred and ten (110) parts and the algæ from about ten (10) to twenty (20) parts.

3. A composition of matter consisting of approximately ninety (90) parts of water to approximately ten (10) parts of Irish moss.

ANDREW J. ROWLAND.